(12) United States Patent
Wong et al.

(10) Patent No.: US 11,418,845 B2
(45) Date of Patent: Aug. 16, 2022

(54) SYSTEM AND METHOD FOR INTERACTIVE REMOTE MOVIE WATCHING, SCHEDULING, AND SOCIAL CONNECTION

(71) Applicant: PARAMOUNT PICTURES CORPORATION, Hollywood, CA (US)

(72) Inventors: Abraham Chee Shun Wong, Manhattan Beach, CA (US); Alyson Elise Grove, Los Angeles, CA (US); Eugene M. Lee, Northridge, CA (US); Stephanie Anne Simard, Los Angeles, CA (US)

(73) Assignee: Paramount Pictures Corporation, Hollywood, CA (US)

( * ) Notice: Subject to any disclaimer, the term of this patent is extended or adjusted under 35 U.S.C. 154(b) by 0 days.

(21) Appl. No.: 15/290,218

(22) Filed: Oct. 11, 2016

(65) Prior Publication Data

US 2017/0034229 A1 Feb. 2, 2017

Related U.S. Application Data

(63) Continuation of application No. 14/665,693, filed on Mar. 23, 2015, now Pat. No. 9,674,239, which is a
(Continued)

(51) Int. Cl.
*H04N 21/4788* (2011.01)
*G06F 21/10* (2013.01)
(Continued)

(52) U.S. Cl.
CPC ....... *H04N 21/4788* (2013.01); *A63F 13/352* (2014.09); *G06F 16/182* (2019.01);
(Continued)

(58) Field of Classification Search
CPC ............ H04N 21/242; H04N 21/4788; H04N 21/4307; H04N 21/47202;
(Continued)

(56) References Cited

U.S. PATENT DOCUMENTS

| 7,962,948 B1 * | 6/2011 | Girouard | G06Q 30/02 725/105 |
| 7,996,566 B1 * | 8/2011 | Sylvain | H04N 7/15 709/248 |

(Continued)

FOREIGN PATENT DOCUMENTS

| JP | 2005-244605 A | 9/2005 |
| JP | 2008-172745 A | 7/2008 |

(Continued)

OTHER PUBLICATIONS

Non-Final Office Action of U.S. Appl. No. 14/665,693, dated Oct. 4, 2016, 12 pages.
(Continued)

*Primary Examiner* — David R Lazaro
(74) *Attorney, Agent, or Firm* — Baker & McKenzie LLP (57) ABSTRACT

Disclosed is a media sharing system that provides shared experiencing of licensed media content such as movies. The system includes a web server that communicates with multiple client devices over the internet whereby a user's multiple social contacts can participate in a synchronized stream of licensed media content such as movies. The system is able to schedule the multi-user experiencing of the licensed media content and further synchronize the streaming of the licensed content so the participating users receiving the media streams in a substantially synchronized manner. The system still further provides for social content interaction amongst the multiple recipients so that the multiple users can interact in a time-contextual manner consis-
(Continued)

tent with the substantially synchronized receipt of the licensed media content.

26 Claims, 7 Drawing Sheets

Related U.S. Application Data continuation of application No. 13/756,444, filed on Jan. 31, 2013, now Pat. No. 8,990,303.

(51) Int. Cl.
```
G06F 16/60      (2019.01)
G06F 16/70      (2019.01)
G06F 16/182     (2019.01)
H04N 21/472     (2011.01)
A63F 13/352     (2014.01)
H04L 67/306     (2022.01)
H04L 67/02      (2022.01)
H04L 67/131     (2022.01)
H04L 9/40       (2022.01)
H04N 21/00      (2011.01)
H04L 65/403     (2022.01)
H04L 65/60      (2022.01)
H04L 51/04      (2022.01)
H04L 51/52      (2022.01)
H04N 21/262     (2011.01)
H04N 21/478     (2011.01)
H04L 65/611     (2022.01)
G06Q 50/00      (2012.01)
```

(52) U.S. Cl.
CPC .............. *G06F 16/60* (2019.01); *G06F 16/70* (2019.01); *G06F 21/10* (2013.01); *H04L 51/04* (2013.01); *H04L 51/32* (2013.01); *H04L 63/10* (2013.01); *H04L 65/403* (2013.01); *H04L 65/60* (2013.01); *H04L 67/02* (2013.01); *H04L 67/306* (2013.01); *H04L 67/38* (2013.01); *H04N 21/00* (2013.01); *H04N 21/26225* (2013.01); *H04N 21/26241* (2013.01); *H04N 21/4781* (2013.01); *H04N 21/47202* (2013.01); *H04N 21/47217* (2013.01); *G06Q 50/01* (2013.01); *H04L 65/4076* (2013.01)

(58) Field of Classification Search
CPC ......... H04N 21/26258; H04N 21/4325; H04N 21/4781; H04N 21/4825; G06F 21/10; H04L 65/4084
See application file for complete search history.

(56) References Cited

U.S. PATENT DOCUMENTS

| | | | | |
|---|---|---|---|---|
| 8,010,690 B2* | 8/2011 | Finger | ...................... | H04N 5/76 463/42 |
| 8,910,208 B2* | 12/2014 | Hartman | .................. | H04N 7/15 348/14.07 |
| 8,990,303 B2* | 3/2015 | Wong | ...................... | H04L 67/02 709/204 |
| 9,129,087 B2* | 9/2015 | Grab | ...................... | G06F 21/10 |
| 9,426,530 B2* | 8/2016 | Logan | ............... | H04N 21/4788 |
| 9,432,746 B2* | 8/2016 | Spears | ............... | H04N 21/4722 |
| 9,674,239 B2* | 6/2017 | Wong | ...................... | H04L 51/04 |
| 10,021,429 B1* | 7/2018 | Talvensaari | .......... | G06F 16/435 |
| 10,334,329 B2* | 6/2019 | Spears | ............... | H04N 21/8541 |
| 2003/0078972 A1* | 4/2003 | Tapissier | ............ | H04N 21/4532 709/204 |
| 2004/0055014 A1* | 3/2004 | Edelson | ............. | H04N 21/6581 725/110 |
| 2006/0190966 A1* | 8/2006 | McKissick | ......... | H04N 21/2543 725/61 |
| 2006/0230415 A1* | 10/2006 | Roeding | ............. | H04N 21/4758 725/34 |
| 2007/0255785 A1 | 11/2007 | Hayashi et al. | | |
| 2008/0034040 A1* | 2/2008 | Wherry | ............... | G06Q 10/107 709/204 |
| 2008/0081700 A1* | 4/2008 | Biniak | ................. | H04N 21/252 463/42 |
| 2008/0141378 A1 | 6/2008 | McLean | | |
| 2009/0080635 A1* | 3/2009 | Altberg | ............... | H04L 65/1069 379/216.01 |
| 2009/0094656 A1 | 4/2009 | Carlucci | | |
| 2009/0150553 A1* | 6/2009 | Collart | ................... | G11B 27/34 709/229 |
| 2009/0217329 A1* | 8/2009 | Riedl | ................. | H04N 21/4314 725/93 |
| 2009/0249222 A1* | 10/2009 | Schmidt | ............. | H04N 21/4143 715/751 |
| 2009/0271524 A1 | 10/2009 | Davi et al. | | |
| 2009/0276805 A1* | 11/2009 | Andrews, II | ....... | H04N 21/2547 725/35 |
| 2009/0328120 A1* | 12/2009 | Finger | .................. | H04N 21/242 725/110 |
| 2010/0034510 A1* | 2/2010 | Oda | ....................... | G06Q 30/06 386/350 |
| 2010/0162324 A1* | 6/2010 | Mehta | ................. | H04N 21/4788 725/61 |
| 2010/0174783 A1 | 7/2010 | Zarom | | |
| 2010/0208082 A1* | 8/2010 | Buchner | ................ | H04H 20/18 348/207.1 |
| 2010/0306655 A1 | 12/2010 | Mattingly et al. | | |
| 2010/0306671 A1 | 12/2010 | Mattingly et al. | | |
| 2011/0063317 A1* | 3/2011 | Gharaat | ................ | G11B 27/322 345/545 |
| 2011/0072366 A1* | 3/2011 | Spencer | ................... | H04L 67/02 715/757 |
| 2011/0145881 A1 | 6/2011 | Hartman et al. | | |
| 2011/0161834 A1* | 6/2011 | Shadfar | .................. | H04L 67/38 715/753 |
| 2011/0195790 A1* | 8/2011 | Konkle | .................... | A63F 13/92 463/42 |
| 2011/0197237 A1 | 8/2011 | Turner | | |
| 2011/0197238 A1 | 8/2011 | Turner | | |
| 2011/0214144 A1* | 9/2011 | Girouard | ............... | G06Q 30/02 725/38 |
| 2012/0096121 A1* | 4/2012 | Hao | ....................... | H04L 67/289 709/219 |
| 2012/0124486 A1 | 5/2012 | Robinson et al. | | |
| 2012/0131609 A1* | 5/2012 | Fernandez | ......... | H04N 21/4788 725/34 |
| 2012/0159337 A1* | 6/2012 | Travilla | ............. | G06Q 30/0631 715/738 |
| 2012/0215684 A1* | 8/2012 | Kidron | .................. | G06F 15/167 705/39 |
| 2012/0232954 A1* | 9/2012 | Calman et al. | .... | G06Q 30/0625 705/7.32 |
| 2012/0272162 A1* | 10/2012 | Surin | ....................... | H04L 67/38 715/753 |
| 2013/0091214 A1* | 4/2013 | Kellerman | ............. | G06Q 10/00 709/204 |
| 2013/0117468 A1* | 5/2013 | Ibasco | .............. | H04N 21/26258 709/248 |
| 2013/0133000 A1* | 5/2013 | Kelley | ............... | H04N 21/4126 725/37 |
| 2013/0339159 A1* | 12/2013 | Shaikh | ............... | H04N 21/4788 705/14.73 |
| 2013/0347017 A1* | 12/2013 | Li | ...................... | H04N 21/4126 725/18 |
| 2014/0033265 A1* | 1/2014 | Leeds | ..................... | G06F 21/10 726/1 |
| 2014/0214920 A1* | 7/2014 | Wong | ..................... | H04L 51/04 709/203 |

(56) References Cited

U.S. PATENT DOCUMENTS

| | | | | |
|---|---|---|---|---|
| 2014/0298373 | A1* | 10/2014 | Jing | H04N 21/4788 725/28 |
| 2015/0215352 | A1* | 7/2015 | Wong | G06F 16/70 709/204 |
| 2015/0304605 | A1* | 10/2015 | Hartman | H04N 21/4788 725/109 |
| 2016/0014477 | A1* | 1/2016 | Siders | H04N 21/8133 725/32 |
| 2016/0182971 | A1* | 6/2016 | Ortiz | H04N 21/42224 725/34 |
| 2017/0034229 | A1* | 2/2017 | Wong | H04L 65/60 |
| 2017/0238058 | A1* | 8/2017 | Wong | H04L 51/32 709/219 |

FOREIGN PATENT DOCUMENTS

| | | |
|---|---|---|
| JP | 2009-530923 A | 8/2009 |
| JP | 2011-501260 A | 1/2011 |
| JP | 2011520302 A | 7/2011 |
| KR | 10-2008-0113069 B1 | 12/2008 |
| KR | 10-2012-0135523 B1 | 12/2012 |
| RU | 2009126606 A | 1/2011 |
| WO | 2007133847 A2 | 11/2007 |

OTHER PUBLICATIONS

International Search Report and Written Opinion, PCT/US2014/013646, dated May 15, 2014, 12 pages.
EPIX Press Releases, "EPIX Introduces First Interactive Social Viewing Experience of Feature-Length Films Through Partnership with ClipSync," downloaded from http://epixnews.tumblr.com/post/265124966/epix-introduces-first-interactive-social-viewing/, (Mar. 26, 2013), 3 pages.
View of EPIX Private Screen Room home page, (2013), 4 pages.
"ooVoo update lets you and a party of 11 watch YouTube together," http://www.engadget.com/2013/01/08/oovoo-watch-together/, (Jan. 8, 2013), 2 pages.
View of Paramount Movies UltraViolet Movie Redemption, Purchases, Movie Playback, My Movies, http://www.paramountmovies.com/index.html?pageId=171[Jan. 14, 2013 11:04:34 am]/, (2013), 6 pages.
View of Hulu on Xbox 360, http://www.hulu.com/ and http://www.hulu.com/watch/452934/, (2013), 1 page.
View of Facebook, https://www.facebook.com/ and http://www.facebook.com/photo.php?v=10151014642773737&set=vb.6920564369&type=3&theater/, (2013), 1 page.
View of Amazon, http://www.amazon.com/ and http://ww.amazon.com/Star-Trek/dp/B002PMPTIO/ref=sr_1_1? ie=UTF8&qid=1360801599&sr=8-1&keywords=star+trek/, (2013), 1 page.
View of YouTube, http://www.youtube.com/ and http://www.youtube/watch?v=LqldwoDXHKg/, (2013), 1 page.
View of Pinterest, http://pinterest.com/and http://pinterest.com/pin/77616793548180990/, (2013), 1 page.
View of Google+, https://plus.google.com/, (2013), 1 page.
View of Paramount Movies, http://www.paramountmovies.com/ and http://www.paramountmovies.com/startrek2009.html/, (2013), 1 page.
View of Skype, http://www.skype.com/, 2013,1 page.
View of NetFlix, https://signup.netflix.com/Login and http://movies.netflix.com/WiMovie/Ferris_Bueller_s_Day_Off/498716?trkid=2361337, 2013, 1 page.
View of NBC, http://www.nbc.com/ and http://www.nbc.com/saturday-night-live/video/february-9-justin-biever/n32607/, 2013, 1 page.
View of Cisco WebEx Meeting Center, 2013, 1 page.
View of Hulu, http://www.hulu.com/watch/458709, Mar. 20, 2013, 4 pages.
View of Microsoft Silverlight, http://www.microsoft.com/silverlight/, (2013), 1 page.
View of Twitter, https://twitter.com/, (2013), 1 page.
View of Sound Cloud, https://soundcloud.com/, (2013), 1 page.
View of Linkedin, http://www.linkedin.com/nhome/, (2013), 1 page.
Office Action issued in Chinese Application No. 201480017707.1; dated Jul. 26, 2018; 18 pages.
Pereira, Mafalda; Communication Pursuant to Article 94(3) EPC for European Application No. 14 745 731.1; dated Apr. 20, 2018; 5 pages.
Ikeda, Junya, et al.; "SNS-Based System for Supporting Simultaneous Video Watching among Remote Users"; Information Processing Society of Japan; IPSJ SIG Technical Report, vol. 2012-DPS-151, No. 14; May 21, 2012; 6 pages.
Office Action and Search Report for Russian Application No. 2015132204 dated Oct. 3, 2017; 6 pages.
Notice of Reasons for Rejection for Japanese Application No. 2015-556108 dated Jan. 31, 2018; 10 pages.
Office Action in South Korean Application No. 10-2018-7034206 dated Mar. 18, 2019; 20 pages.
Office Action in Japanese Application No. 2018-123512 dated Jul. 24, 2019.
Office Action in Chinese Application No. 201480017707.1 dated May 8, 2019; 34 pages.
Office Action dated Oct. 9, 2019 in Chinese Application No. 201480017707.1.
Office Action dated Oct. 28, 2019 in Korean Application No. 10-2018-7034206.
Office Action dated Feb. 20, 2020 in connection with Brazil Application No. BR112015018366-2, 4 pages.
Office Action dated May 7, 2020 in connection with Australian Application No. 2018201962, 4 pages.
Office Action dated Apr. 2, 2020 in connection with European Application No. EP14745731.1, 5 pages.
Office Action dated Jul. 30, 2020 in connection with Indian Application No. 6910/DELNP/2015, 7 pages.
Office Action dated Jul. 6, 2020 in connection with Korean Application No. 10-2020-7008834, 12 pages.
Office Action dated Jun. 1, 2021 in connection with Japanese Application No. 2020-072113.
Office Action dated Aug. 5, 2021 in connection with Korean Application No. 10-2020-7008834.

* cited by examiner

SYSTEM AND METHOD FOR INTERACTIVE REMOTE MOVIE WATCHING, SCHEDULING, AND SOCIAL CONNECTION

CROSS-REFERENCE TO RELATED APPLICATIONS

This application is a continuation of U.S. application Ser. No. 14/665,693, filed on Mar. 23, 2015, which is a continuation of U.S. application Ser. No. 13/756,444, filed on Jan. 31, 2014, now U.S. Pat. No. 8,990,303 and is incorporated herein by reference in its entirety. This is a continuation application of U.S. application Ser. No. 13/756,444, which was filed on Jan. 31, 2013 and is incorporated herein by reference.

BACKGROUND

Certain online/internet-based video systems are known in the art. Such known systems include YouTube, which allows users to post video content that other users can "stream" from and provides a comment section beneath the video window for users to comment upon the video. Many other social and news sites having video operate in similar ways—Facebook, Hulu, and public media outlets such as NBC, CBS, Fox, etc., provide for video streaming and comments below by registered users. Such sites also provide the ability to "share" links to observed videos, such that someone on Facebook can share a video to another user's video stream via email. And public news media outlets typically provide "share" links whereby an observed video/news story can be "shared" to a user's social media circles via quick links to, e.g., Google+, Twitter, Facebook, LinkedIn, and Pinterest.

Other known internet video systems include those that provide videoconferencing, such as Google+ Hangouts, WebEx, and Skype. These types of systems typically provide for multi-user video interaction through live audio and video streamed from one user to multiple other users or in some cases from multiple users to multiple other users. These video systems typically also provide for chat interaction (text instant messaging ancillary to the video stream) from one user to multiple other users or to selected other users.

Still other known video systems comprise those that provide for the downloading of copies of licensed media content. Systems like this include ParamountMovies.com, Amazon, Netflix, or the like. Through these sites, users can purchase and download licensed media content and then post notifications to other users' social media feeds that they have purchased/downloaded the indicated content. The sites also sometimes provide for comments/reviews to be provided at the purchase site, but that is typically the extent of the possible social interaction available.

SUMMARY

The above-described known online/internet sites have a number of shortcomings. In the context of providing for an interactive movie experience, it is desired for multiple friends or family to participate together in a movie watching experience and to accordingly socially engage in real-time and contextually with the movie. Such interactions are ideally made in-time with the scenes appearing in the movie. In sum, none of the prior systems replicate, across the internet, the personal experience of watching a movie together with friends and loved ones.

The presently described embodiments provide for the purchasing of licensed media content, such as movies and songs, and the digital rights management tools for managing the number of playbacks and/or group purchases encompassing multiple users, viewers, and purchasers for the licensed media content. The described embodiments further provide for group scheduling of common watching times for the licensed media content and for the sharing of comments as the movie occurs and in the context of the movie viewing itself. Further, the described embodiments allow for time-indexing of the movie such that the real-time comments around the movie-watching experience can be shared and recorded in the context of the movie watching experience so that a friend who is in the viewer's social group or family can later watch a recorded version of a movie and see the contextual social commentary provided by the later viewer's friend and/or family.

In other words, the disclosed systems and methods provide for synchronization of recorded media delivery to multiple parties while providing for contextual social chat about the media delivery. The described embodiments include technology to keep any synchronized video stream to a watching party from getting too far ahead or too far behind. This synchronization can be provided, for example, by providing a feedback loop through internet communications from the receiving clients' media players back to servers operating on the main system, slowing down or speeding up one or more media streams to provide for simultaneous delivery of the same media context, and indexing of the media stream itself can be used to help confirm the relative synchronicity. The described systems further are operable to use the time encoding for tie-in trivia and voting games related to favorite movie scenes and characters. This and other second-screen content can be provided to play along in real time with a movie for a more engaging interactive experience in addition to the previously discussed features.

Generally speaking, the described systems provide for a shared experiencing of licensed media content such as movies or proprietary live video streams. Such systems can include a web server that communicates with multiple client devices over the internet whereby a user's multiple social contacts can participate in a synchronized stream of licensed media content such as movies. The system is able to schedule the multi-user experiencing of the licensed media content and further synchronize the streaming of the licensed content so the participating users receiving the media streams in a substantially synchronized manner. The system still further provides for social content interaction amongst the multiple recipients so that the multiple users can interact in a time-contextual manner consistent with the substantially synchronized receipt of the licensed media content.

BRIEF DESCRIPTION OF THE DRAWINGS

For a more complete understanding of the present disclosure, example embodiments, and their advantages, reference is now made to the following description taken in conjunction with the accompanying drawings, in which like reference numbers indicate like features, and.

Although similar reference numbers may be used to refer to similar elements for convenience, it should be appreciated that each of the various example embodiments may be considered to be distinct variations.

DETAILED DESCRIPTION

Figure 1:
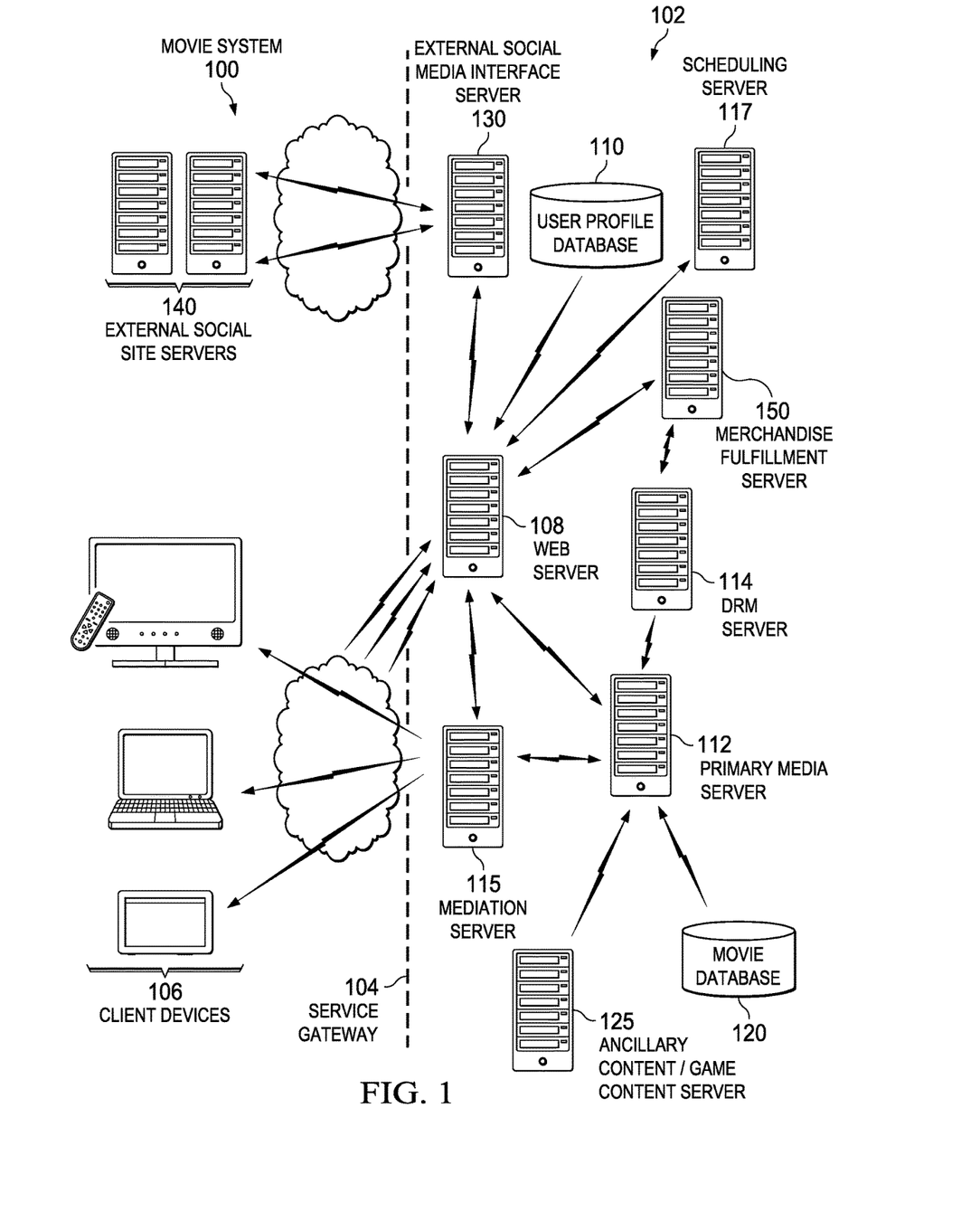
FIG. 1 is an architectural diagram of an exemplary embodiment of a system for interactive remote movie watching, scheduling, and social connection.

Illustrated in FIG. 1 is an architecture of an exemplary embodiment of a system 100 for interactive remote movie watching, scheduling, and social connection. In the illustrated embodiment, various exemplary servers, client machines, and external services are illustrated for such an interactive system 100. The system elements for an exemplary service provider 102 configuration are provided behind a service gateway 104, which serves as the firewall and/or external connection from the service provider 102 to the "cloud" internet connection(s) shown in the figure. It should be appreciated that the connections through the service gateway can comprise one or more physical network connections via one or multiple servers (e.g., web server(s) 108 and mediation server(s) 115, described further below) and that multiple virtual tunnels can be formed through these one or multiple physical network connections.

In the illustrated embodiment, it should be appreciated that the "service provider" 102 may comprise multiple related/interconnected systems and subsystems, which could be administrated through one or more business partnerships or vendor relationships, but a single connected system is illustrated in the present embodiment for ease of understanding. In the illustrated embodiment, web server(s) 108 generally provide for the top-level interaction with the various client devices 106. The web server 108 accordingly communicates with the client devices 106 to provide for user logins through their client devices, to keep track of and update user profiles or information about user preferences, as well as to facilitate purchase of licensed media content and/or physical merchandise.

Still referring to FIG. 1, the user's preferences, purchases, and the like are stored via the web server 108 into the user profile database 110. While the embodiment illustrated in the figure shows the user profile database 110 directly connected to the web server 108, it should be appreciated that there could be database servers or other intermediate servers interposed between the web server 108 and the user profile database 110. Also provided in the illustrated embodiment is a merchant fulfillment server 150, which is in communication with the web server 108 and is operable to facilitate user payments for purchased content, such as online media content and/or physical merchandise to be shipped via traditional ground shipping. The merchant fulfillment server 150 would be used, when the user purchases content, to process the credit card payment, PayPal payment, or payment from another payment system.

Once a purchase is approved, the system proceeds to "license" the media for online distribution to the user or to process physical goods for shipment. As to the licensing of the media for online delivery, the merchandise fulfillment server 150 connects directly or indirectly to the digital rights management (DRM) server 114, which using secure cryptography means is operable to "unlock" delivery of media from the primary media server 112, which in turn accesses and streams or facilitates the streaming of the unlocked media content that is stored on the movie or other media database 120.

It should be appreciated also that the fulfillment server 150, DRM server 114, and web server 108 would remain in communication with each to ensure that the proper licensing rights are synchronized and recorded in the user profile database 110. It should be further appreciated that licensed media content includes media content for which digital rights are intended to be maintained, and that multiple technologies exist for protecting the proprietary rights in streams of such media, including watermarking and various types of digital rights management (DRM). Currently known commercial implementations of such technologies for protecting licensed media content include Digital Entertainment Content Ecosystem's "UltraViolet" (see www.uvvu.com) and Microsoft's "Silverlight." These techniques and other techniques according to design choice are appreciated to be operable to create licensed media content as described in the present application.

As to the primary media server 112 shown in FIG. 1, while this may be provided by a traditional server machine (computer), as with other servers and computing machines described herein, the described server might be a collection of servers or distributed servers or the like. Such collections of servers might be content delivery networks or CDNs, such as are provided by companies like Akamai. These types of networks provide for or facilitate the streaming and multicasting of media content over the internet. Such CDNs include not only distributed computing machinery but also storage for buffering the content being delivered.

Also provided in FIG. 1 is an ancillary content/game content server 125. This ancillary content could include second screen content that would be available to users in parallel to the media content being played. The "Scene It?" franchise could be one possible implementation of this ancillary content. With further regard to the second screen content, this additional content can be delivered in a different window on the viewing clients 106, or separate clients 106 can be used for the streaming media content and the second screen content (e.g., the main streaming could be on a personal computer and smart TV and the second screen content could be on a tablet computer or smart phone). More generally, both the media content and the second-screen content can be displayed across multiple platforms, including interactive/IP TVs, personal computers, console gaming devices, tablet devices, netbooks, laptops, and mobile phones, and all of these could be presented on these various devices whatever their operating system.

Still referring to FIG. 1, provided is an external social media interface server 130 for providing updates and otherwise interacting with external social media sites such as Facebook, LinkedIn, Google+, Pinterest and the like. The present implementation provides as an embodiment a tight integration with one or more of these external social media sites whereby any activity you are performing can be posted and integrated into your "wall" or other newsfeed. For example, if you invite your friends to watch a movie or are watching a movie with friends, there can be an "event" posted to your wall or newsfeed. Purchases can be shared as well as news items, which can help to drive additional content sales revenue. For example, the newsfeed item could include a link to a trailer which would in turn provide an option to purchase the content through the service provider's website.

One possible social networking approach, which can be done through an external social network or one managed by the service provider directly to a social network of its customers, or some combination of the foregoing, is to allow a purchaser to send an "event" invitation to multiple of his or her social network connections whereby the system can schedule a social viewing for the multiple invitees who accept the invitation. The DRM server 114 in connection with the web server 108 or other described servers would be operable to manage the digital rights for the social viewing to ensure that only the permitted number of digital media download streams are provided.

As for the scheduling and payment for the social viewing, a possible approach would be to charge a certain fee that would include a multiple viewer license, such as including the ability to invite up to ten friends to do a scheduled, one-time social viewing. The scheduling server 117 is provided to communicate with the web server and external social media sites (servers 140) to facilitate the scheduling of an interactive group media stream or social viewing for a user's social network. At the end of the social viewing, the system is enabled to offer that one or more of the invited friends can purchase a similar license or even a regular DVD for shipment through traditional ground shipping, or of course to provide other possible promotional offers to the participants.

As with other embodiments described herein, the "ten friends" mentioned above for the schedule invitation is merely exemplary, and the number of invites could be a single invite, up to ten invites, up to 100 invites, or any other number according to the type of implementation considered. For example, the described system would further enable wide-scale events for purchase (revenue) purposes or for free (promotional) purposes. Thus, you could have a corporate sponsored "event" where hundreds or thousands of viewers could sign up for a live stream with commentary, second stream content, and/or gaming content or interaction. These hundreds or thousands of attendees could be by scheduled invitation, or it could be an "open" invitation.

As another example, for a motion picture hit there could be a public viewing of a "Director's Cut," in which the director could provide commentary between major themes of a playback and/or during the playback. Thus, for example, the showing could be scheduled for Sunday night at 6 pm (e.g., Central Time) and there could potentially be hundreds of thousands of viewers watching simultaneously.

There could be provided a competitive trivia contest on a second screen, and because of the synchronization enabled by the presently described embodiments, risks of someone trying to cheat the game (e.g., by communicating with someone on a slightly differently timed stream) would be substantially mitigated. Particular issues that the disclosed system solves with respect to syncing are differing latencies between viewers/clients and multiple bandwidth issues among the clients/viewers. The disclosed embodiments are capable not just of delaying playback in certain instances but actually increasing playback (compressing time) in order to let feeds that have gotten behind catch up. Further, when the system detects that playbacks have gotten out of synch, it could disable certain functionalities (e.g., real-time games) that would be greatly affected by the lack of sync. To facilitate the synchronization of the multiple users participating in the feed of the media content, there could be provided a feedback from each of the users' video or media players through internet communications whereby the primary media server 112 or mediation server 115 is able to speed up or slow down respective streams to the different players in order to facilitate the syncing or re-syncing of the connections according to the received feedback. It should be appreciated that although internet communications for this feedback loop has been described, this is a design choice and other communications methods (such as other wired networks, wireless phone networks, cable television networks, etc.) may be appropriate according to design considerations.

The disclosed systems are further enabled to implement an approach where a group of people all owning a license to a particular media title want to watch the content together but through the internet at different locations. Again, the present DRM server 114 and associated servers that are a part of the present service provider 102 would be operable to confirm the rights of each person in the group, and the scheduling server 117 would be operable to schedule a viewing by all of the users where they would be given a synchronized common media streaming experience.

In any of the above implementations, although a first user may initiate and schedule a social viewing experience, in certain embodiments any of the participating viewers may be able to control the playback or any other aspects of the social interaction around the playback. As far as other types of control, there could be moderator roles for the "chat" or other "second screen" or other type of function outside of the media playback. Further, the control could be open where any user can control at anytime (e.g., any user could pause the movie playback at anytime). Or the control could be serially passed from one user to another.

With further reference to FIG. 1, a mediation server 115 is shown interposed between the primary media server 112 and the gateway 104 to the internet. The mediation server 115 is operable to synchronize the media streams coming out of the primary media server 112 so the receiving parties (clients 106) all receive the media streams substantially in synchronicity. Although this streaming and synchronizing is shown as being formed by the collective activity of both servers 112, 115, this described embodiment should not detract from the generality of any claims that may issue from the present case, and the primary media server 112 may be a collection of servers or a cloud-based content delivery network (CDN) as previously discussed, further, the functionality of synchronization might be integrated into the primary media server 112 such that a separate mediation server 115 would not be not required.

By "substantially in synchronicity," as stated above, depending on the application, this phrase might mean synchronized within 5 minutes, 1 minute, 30 seconds, 5 seconds, or 1 second, depending on design needs. In particular, if certain chat features or game features are enabled, the clients should receive media streams synchronized in such a fashion that users all have about the same number of seconds to react to the film such as by responding to a trivia question in the same number of whole seconds (or not being off by more than 1 second) or not seeing "spoilers" in the chat window while friends are watching the movie with them. Thus, the need for synchronicity will depend on whether the lack of it would end up detracting from the features being employed by the users.

All of the foregoing functionality can be distributed amongst servers and/or vendors according to system design choices, and it is expressly contemplated that all of the described functionality can be incorporated into a single server, web server, and/or vendor hosting a server or servers, and by the same token all of the described functionality can be distributed amongst various servers, web servers, and/or vendors hosting multiple servers. The described divisions of servers can be physical or virtual divisions, and the various servers can be in the same or different physical locations.

Figure 2:
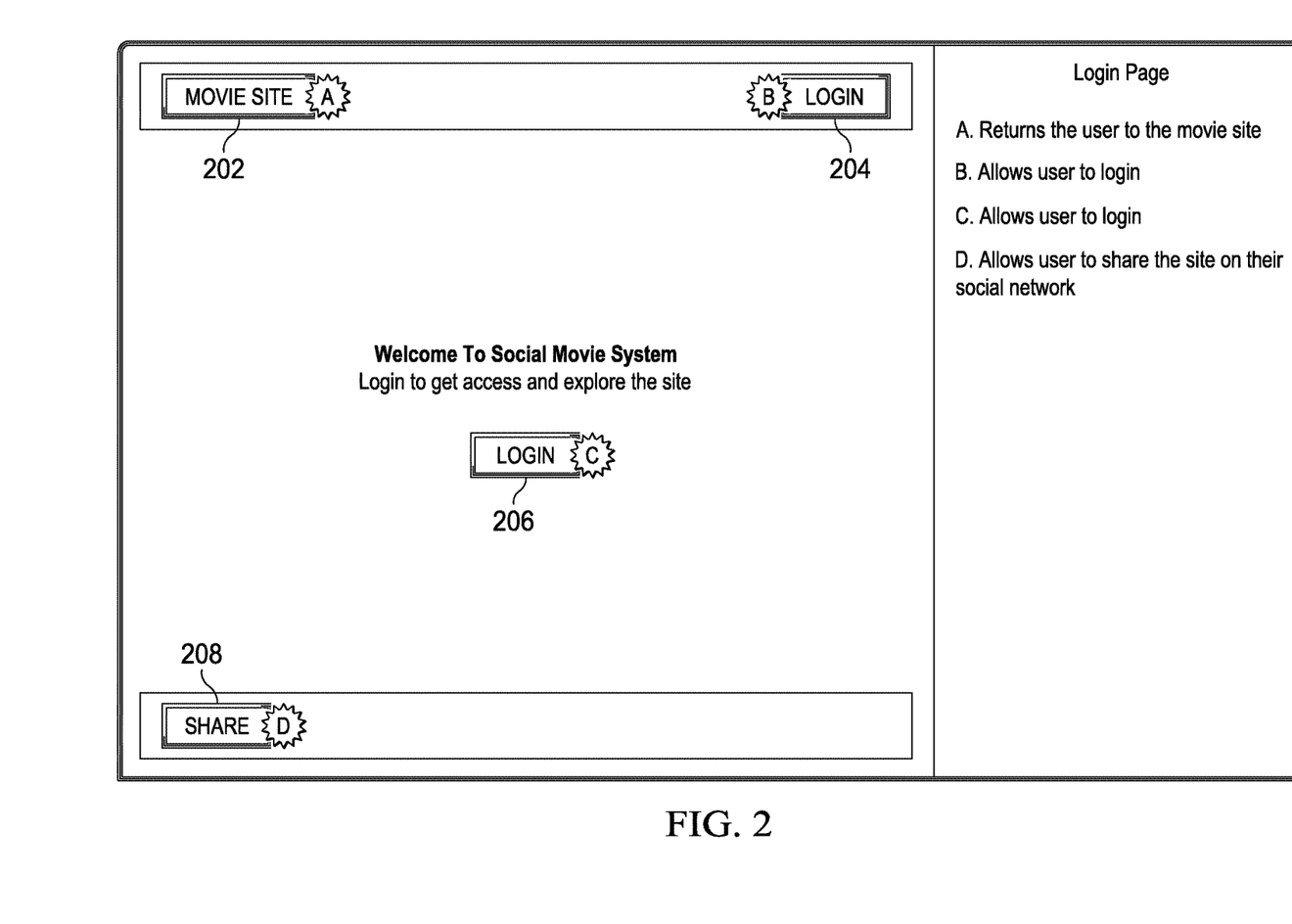
FIG. 2 is a screenshot of a landing site of an exemplary system such as the one set forth in FIG. 1.

Referring now to FIG. 2, provided here is an illustrative user interface screenshot for an exemplary embodiment system 100 as described above. The screenshot represents an example of what would be displayed on the client devices 106 of FIG. 1 through interaction of those client devices with the web server(s) 108. As set forth in FIG. 2, when a user is directed to this landing page for the service, such as from a movie site (e.g., www.next*big*movie.com) the user would be welcomed to a branded service site for the service described herein. In the present example, the service site is referred to generically as "social movie system," so the landing page simply says in this example "Welcome to Social Movie System." From this page, by the button 202 the user is given the option to return to the original movie site from which they came, or login (per buttons 204, 206) to begin interacting with the site with their personalized profile (as stored in the user profile database 110). Having the user login allows for the system to pull up the user profile and allows the users to make purchases and share (per button 208) their social movie system activities with their social networks. This login will further enable the scheduling of interactive movie viewing with the scheduling server 117 to enable the user to watch licensed media content in synchronized fashion with her friends.

Figure 3:
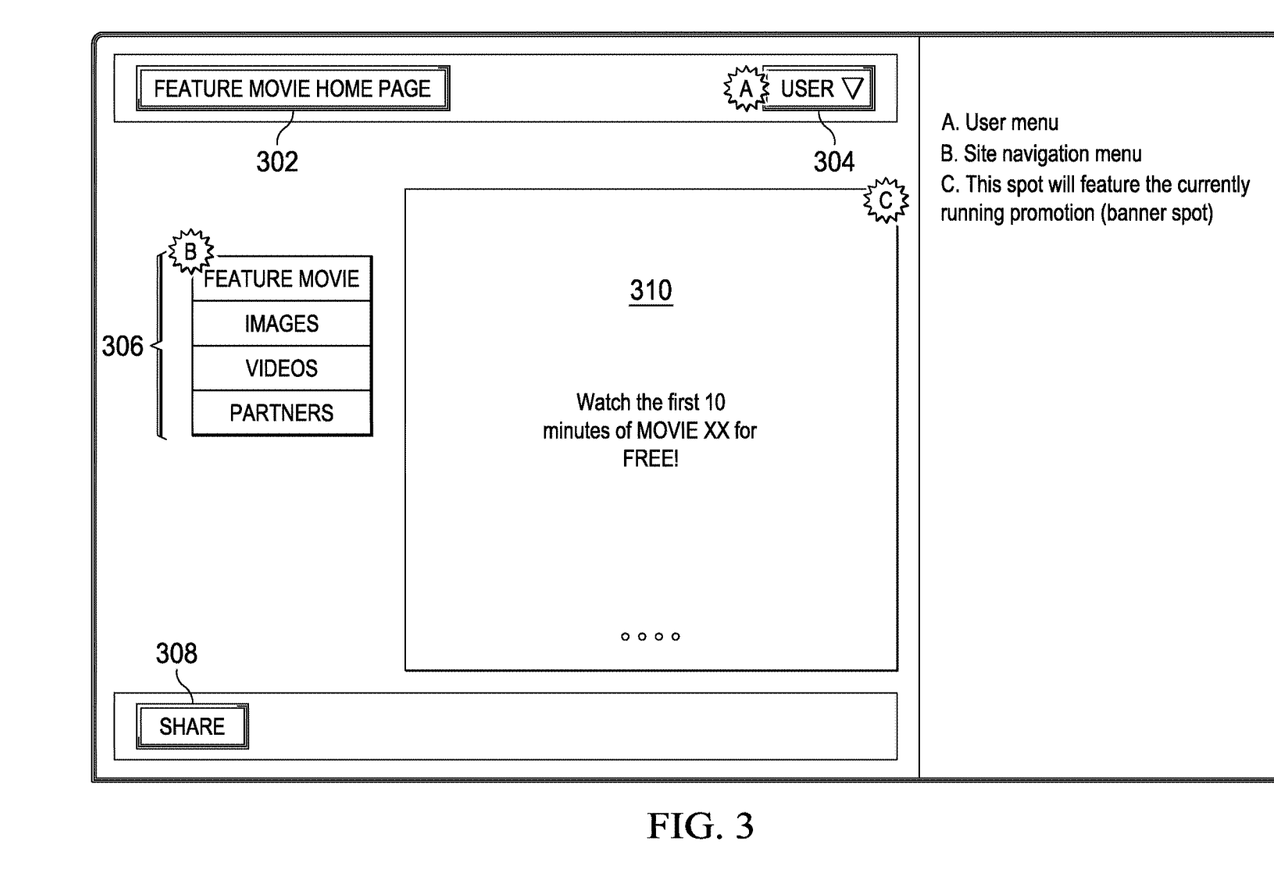
FIG. 3 is another screenshot of an exemplary system as described herein.

Referring now to FIG. 3, illustrated in this figure is an exemplary screenshot of the present system at a subsequent level from the landing site. In this version, in some instances, perhaps because a user had logged in although there could be other bases for advancing to this screen from the landing page, rotating movie promotional spots are being displayed in the center window 310. As an enticement for the user to click on one of these promotions, the user is being offered 10 minutes of free viewing of one of the movies being promoted. Of course, the amount of free viewing offered or even the type of promotion is merely exemplary and should not in any way be argued to limit the coverage of the claims to accused systems only having this same promotion offer.

Still referring to FIG. 3, and as previously described with respect to FIG. 2, a button 302 is provided to return the user to the original movie site or other originating site that directed the user to the site for the presently described system. In this case, there is also a button 304 that provides a user pull-down menu for user-oriented functions. Site navigation menus 306 are further provided to the left of the promotional window 310. These navigation menus 306 can take the user, for example, to a "feature movie" page that would include photos of scenes from the movie, social sharing features, purchasing options, and scheduling options whereby the user would be able to purchase a movie and schedule a social viewing for the movie with him and all his friends. Other options on the site navigation menu include image and video page buttons 306 that could have a number of thumbnails and would provide for "click through" and/or possible purchase of corresponding media or merchandise relating to the images. As with FIG. 2, a "share" button 308 is provided such that the user can share their activities with their social circles.

Figure 4:
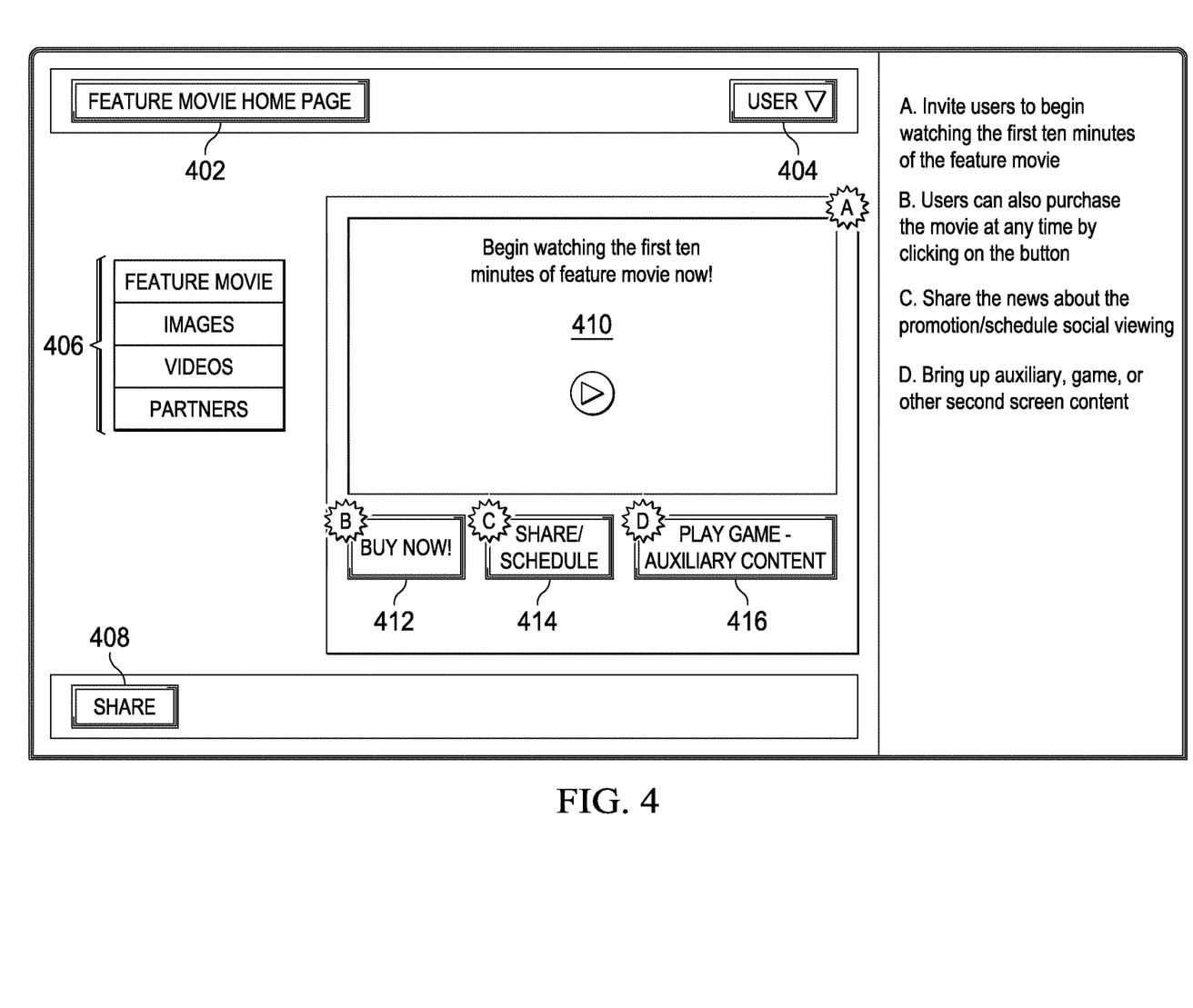
FIG. 4 is another screenshot providing for promotional viewing of a movie or other shared media content and inviting purchase of the content and social interaction around the content.

Referring now to FIG. 4, this figure has much in common with FIG. 3. The buttons referencing the feature move home page 402 and the user menu 404 would have similar functions to that described for the corresponding buttons with respect to FIG. 3. The navigation menus 406 and the "share" button 408 also have the same or similar function as was described for menus/button 306, 308 in FIG. 3. The new aspects illustrated in FIG. 4 relate to presenting a video player window 410, where the video player window 410 is now playing (again, as an example) the first 10 minutes of a movie to encourage purchase of the movie. New social buttons 412, 414, 416 are further provided beneath the video player window 410.

Still referring to FIG. 4, the new social buttons presented in this figure relate to actually purchasing the promotional content (by button 412), which as previously described would initiate a user purchase through the merchandise fulfillment server 150 (see FIG. 1). Also provided is a Share/Schedule button 414, which would interface with internal or external social media functions to invite or inform other users about the user's purchasing/viewing/sharing/scheduling of online media content. Disclosed embodiments herein provide via scheduling server 117 for the scheduling of multiple users to simultaneously watch and engage with each other during the remote screening of licensed media content while being in different physical locations through parallel media streaming. Further provided is the "auxiliary content" button 416, which brings up options for providing "second screen" content such as "Scene It?," IMDb, or similar movie review and information content, or other movie-oriented games, chat windows or any number of other possible second screen options.

Figure 5:
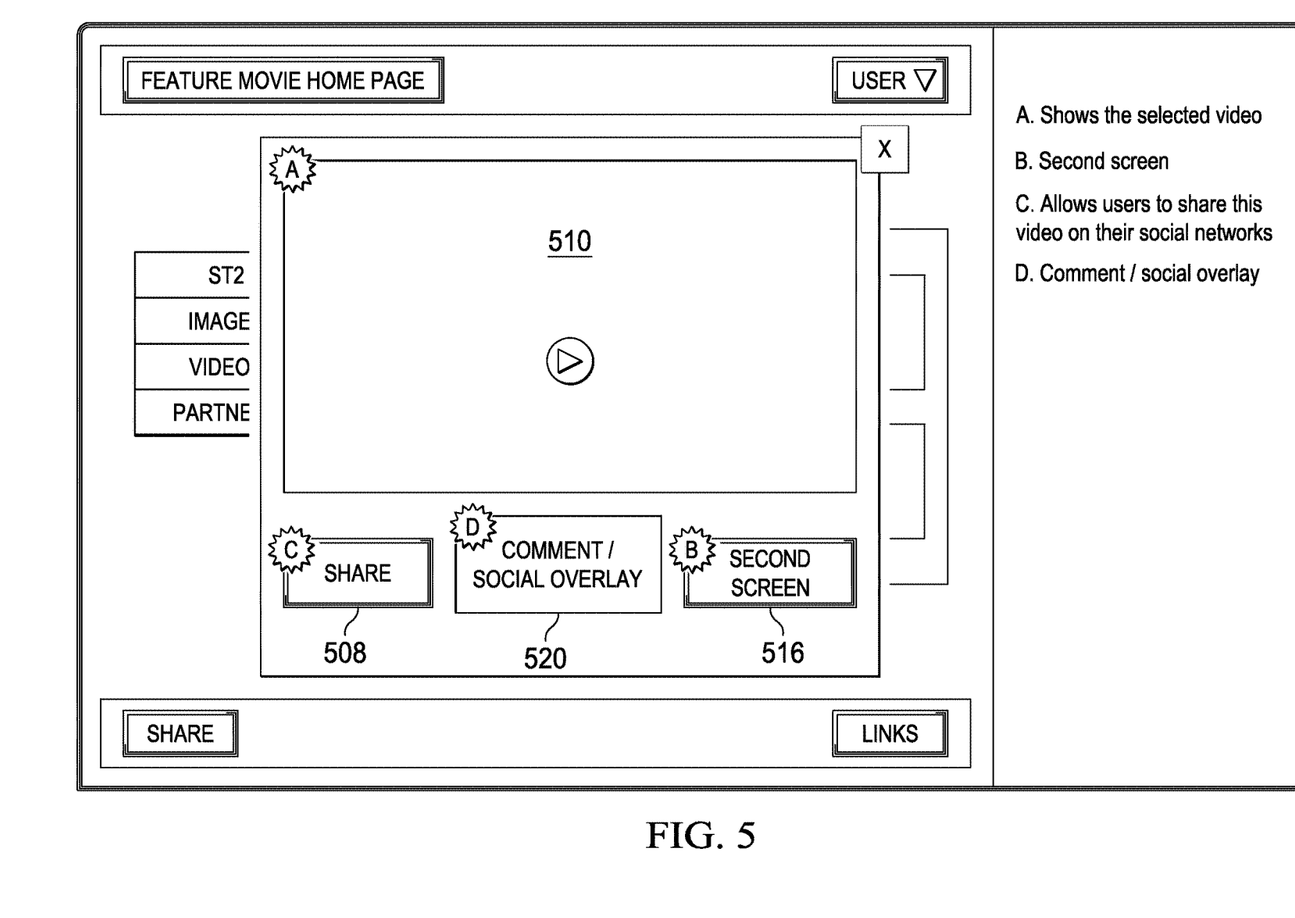
FIG. 5 is another screenshot providing an exemplary media content player (e.g., video player) that combines the playback screen along with time-contextual social interaction.

Referring now to FIG. 5, this figure provides an exemplary screenshot of a video player window 510 when the user has proceeded through purchasing or otherwise securing video rights to licensed content and is engaged in actually viewing the content. This video window would have video controls (e.g., play, fast-forward, rewind, stop, etc.) and could be enlarged compatibly with the display it was being played upon. As previously discussed, the video controls could be "open" such that any user could make a change to the video playback, or it could be "closed" such that only one user at a time could do so, but with another possible embodiment that a first master user could pass control to another user, and so forth.

The social elements in this figure are provided to fully engage the user with his or her friends and family that are watching the content with him or her. Specifically, as described in FIG. 4, there is a "second screen" option button 516 to pull up additional information about the movie being watched, or to play games relating to the movie (e.g., "Scene It?" or other movie trivia or themed action games). There is also a "Share" button 508 on this screen to inform a user's social network of their activities, and as illustrated in this embodiment, the share button 508 has essentially been promoted from the screen behind the video screen that has been previously discussed.

Still referring to FIG. 5, there is provided a chat window 520 or other window for interacting with a user's friends who are watching the movie with the user. The present system also provides for marking/annotating the video images through marking tools or other devices, and through the indexing of the video content all of this interaction can be stored and recalled in certain embodiments through later viewings by the same or different system users who are in the original users' social circles and have been given rights to view the licensed content.

In other words, the recorded social viewing can be archived and played back complete with social interactions occurring during the original watching as if the later watcher of the content had been there observing in real-time. This feature allows for friends and family on another side of the world to still enjoy the conversation occurring around a scene and see the conversation in context of the parts of a movie that inspired the comments.

With respect to the discussion of video players, it should be noted that the means for providing these video players and second screen and other social interaction features can be accomplished by different means. One approach would be to embed a standard video player window as a frame within the web pages served through this system and provide for compatible synchronized content through a standard video player. Another approach would be to provide a customized player. The way the system would serve video to the system and combine second screen content could be effected according to the choices made in this regard. In other words, for "framed" content there could be established separate tunnels for delivering both original media and second screen content to the webpage. For a customized player, it would be possible (though not necessary) to combine the feeds at a server behind the firewall and provide them as a single stream to the customized player. One of ordinary skill in the art would be able to adapt the architecture according to system design needs along either of these paths.

In other words, and still referring to the video player design, some portions of the player functionality can be handled in servers provided by the overall service, whereas the players themselves can include embedded functionality to accomplish some of the features described above. Thus, various functionalities exist in the system 100 and can be distributed among different components within the system.

With further reference to the social interaction facilitated by the social overlay 520 and associated tools described with respect to FIG. 5, the presently described embodiments open very new ways of socially sharing the movie viewing experience even beyond those described for socially viewing a movie in real-time and remotely with friends and family. Because of the time-indexing and tracking capabilities of the present video system, the system provides an unprecedented ability to share screenshots and comments on favorite movie scenes with one's social circles, while watching the movie in real-time. Again, this type of social media sharing, particularly when coupled with links that can take social network contacts to a place to purchase referenced content, fundamentally provides excitement around media content available for license/sale. This functionality basically takes the time code of a movie and takes a snapshot or a clip of the film, sharing it with a user's social network, along with the user's commentary, reviews, or invitation to watch the movie with them or others at a social viewing event.

Figure 6:
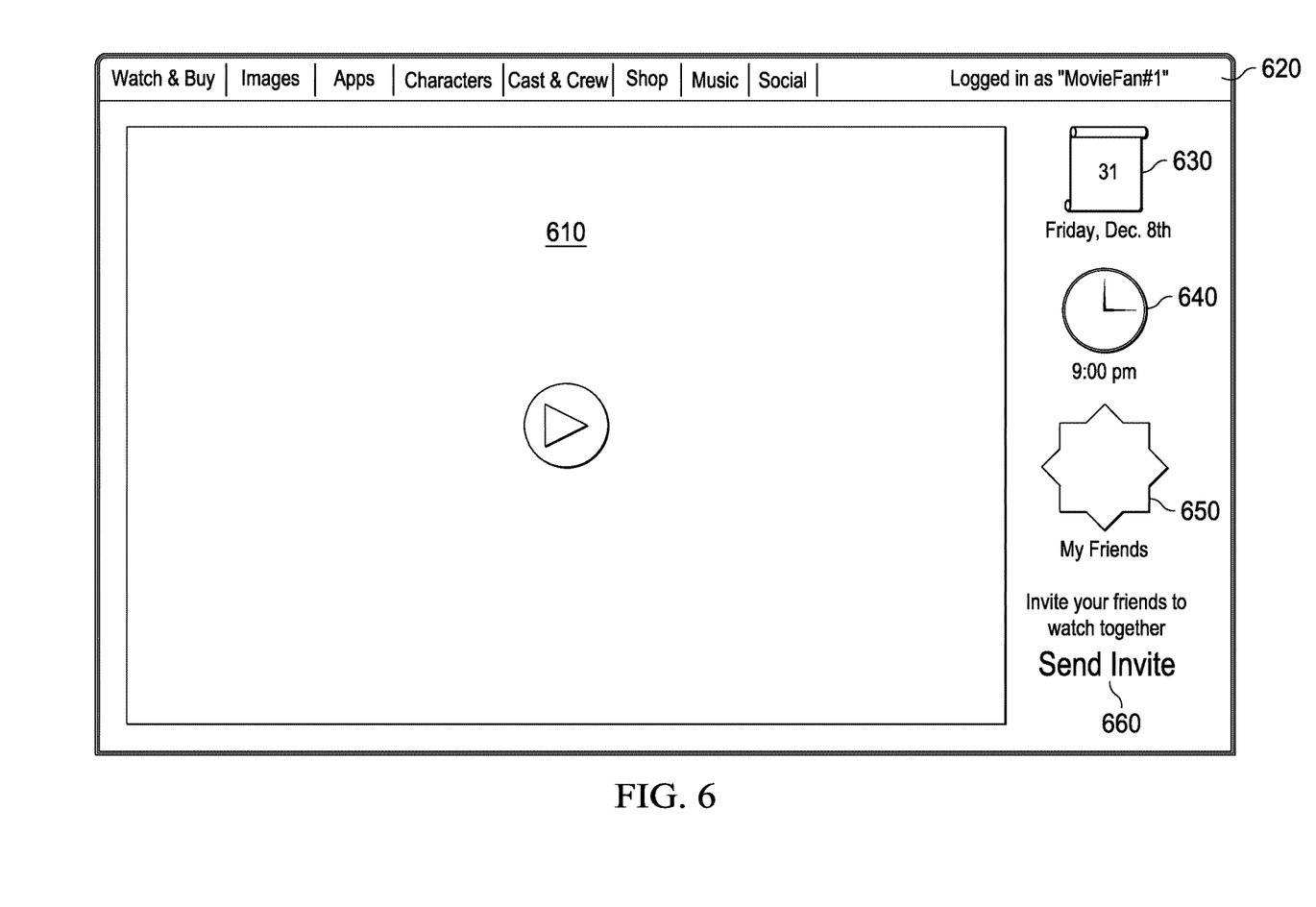
FIG. 6 is a screenshot illustrating the social viewing scheduling feature.

Referring now to FIG. 6, illustrated in this figure is an exemplary embodiment of the scheduling feature described herein. The screenshot here would be provided in an embodiment by the web server 108, and the scheduling information would be established and coordinated through the web server 108 by the scheduling server 117 (see FIG. 1). As previously discussed, there might at the same time be provided a player window 610 that could be illustrating a promotional video or actually be presently showing a regular, licensed media stream. Various other menu options are shown above as menu items 620. And the scheduling options provided include calendar 630, time 640, friends list 650, and send invite 660. In embodiments, the calendar 630 would provide the calendar date for the social viewing and the time 640 would be the time established for the social viewing (per a reference time zone, which would be adjusted according to the invited friends' time zones in order to provide a consistent invitation). Further, the "My Friends" button 650 may be a complete list of friends showing the status of all friends (invited, accepted, pending, etc.) for a given event, whereas the "Send Invite" button 660 might be to invite an existing friend or a presently unconnected friend known by their email or other online identification.

As to the various options shown for in the menu items 620, many of these have been previously discussed, but by way of quick summary the presented options in this embodiment are as follows:

a. "Watch & Buy"—Watch promotional portions of movies and be presented with options to purchase and schedule social viewing events.

b. "Images"—Get access to various image captures from movies and share those movie images with your social network, coupled with you and your network being able to use those images to establish and schedule viewing events.

c. "Apps"—Access and/or download various apps that may be second-screen coordinated with the social viewing events.

d. "Characters"—Gather social information around various movie characters and establish viewing events themed around those characters.

e. "Cast & Crew"—Limited screenings associated with movie releases. This could also be provided consistent with various promotions in which selected members of the general public would get access to the limited screenings. As previously described with respect to functions like a "Director's Cut" screening, the time-indexing of the presently described embodiments provide a heightened ability to provide in-depth background information in the context of the movie and as a part of the screening.

f. "Shop"—Shop for online or physical merchandise.

g. "Music"—Similar to the "Images" feature, allows users to share musical clips or songs from movies with their social networks, whereby the users can comment and interact around the song (and potentially metadata placing the song in context) and providing for a link that could return the social users back to the interactive movie site from where the songs came. As with the other described features, this interaction may lead to group watch scheduling either directly at the social site or back at the interactive movie site or both.

h. "Social"—Various social network connections all provided in a coordinated area of the system.

i. "Logged In"—The login area that gives a user access to their purchased content, friends list and the like, which may be provided through the user records stored in the user profile database 110 (see FIG. 1).

Figure 7:
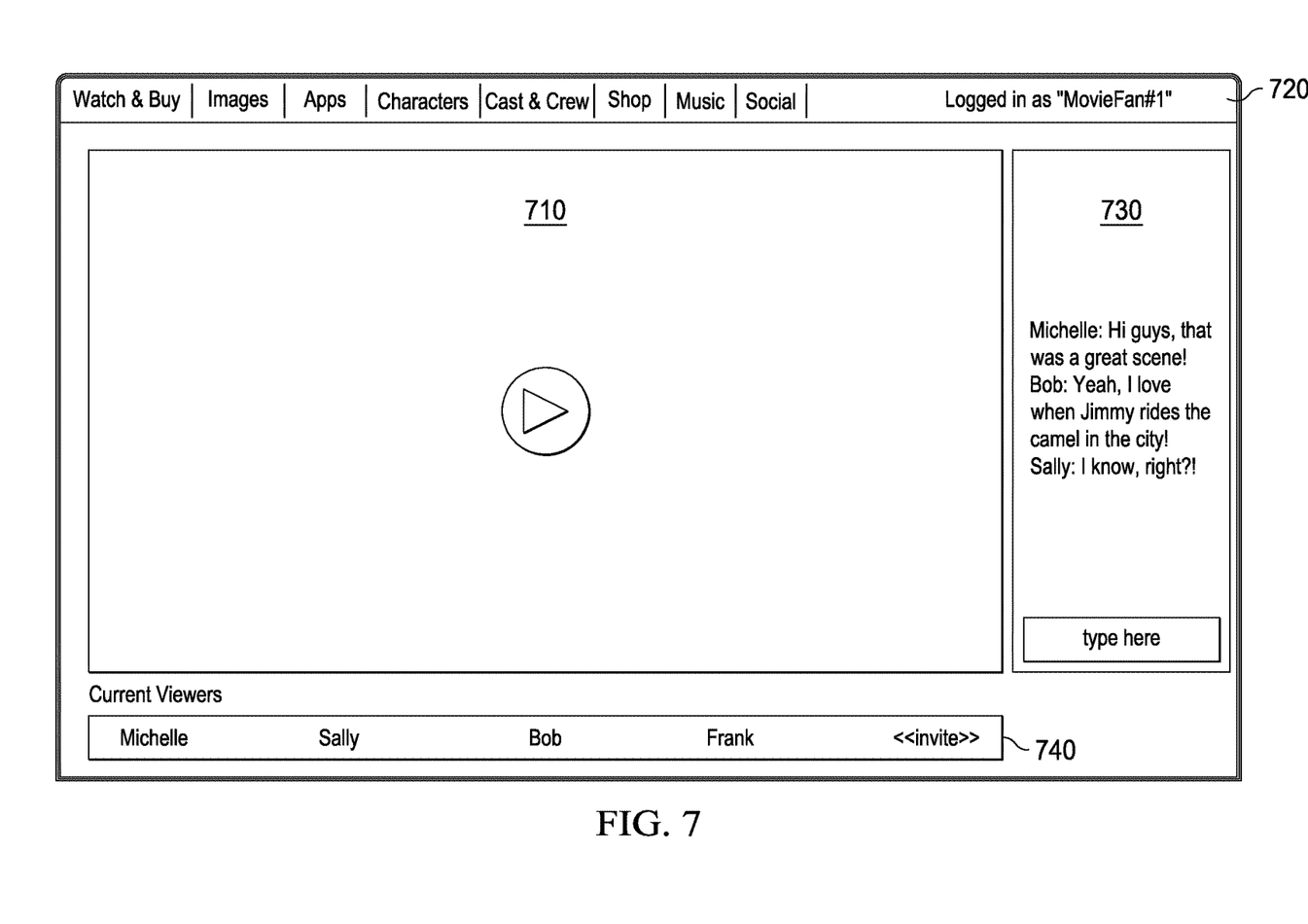
FIG. 7 is a screenshot illustrating the synchronized user chat feature in more detail.

Referring now to FIG. 7, this figure illustrates in greater detail the social chat functionality. As previously described, there is a player window 710 and the above-described menu options 720. The present figure also shows, however, a group of friends discussing a particular scene as that scene occurs in the movie. Prior video players have not been able to stream licensed content and allow multiple users to provide comments to each other while all users are seeing essentially the same scenes. Further, the present system allows for the archiving of the playback with commentary, such that one of the participants or another user in one of their social circles is able to at a later time view the licensed content and the comments left by their friends as in the same context (while the same scene is playing in the movie) that their friend made the comments. FIG. 7 also illustrates a "Current Viewers" bar 740 that shows who is presently watching a movie and gives an "<<invite>>" button to invite others to join.

With general reference to all of the figures described above and in general description of the features and functionalities described herein, the system described also includes functionality whereby either through second screen data or through superimposed data on the media player, popular scenes or images can be suggested to users for sharing through their social networks while the real-time video stream is being watched. Thus, during that live media viewing, a prompt could show up for the users to share an image or a song, and that image or song clip, and the user's commentary, can be posted to Facebook or another social media site.

As another specific embodiment for interacting with a social media site, there exist virtual "pinboards" on the internet as a means for socially interacting and posting pictures or links of interest and allowing your social network to further comment on them and add to the posts. One current such system is Pinterest (www.pinterest.com). The present system would allow for the posting of authorized movie images, along with official or unofficial metadata about the movies and/or particular movie scenes. With included hyperlinks, the social media site could take social network users directly, e.g., to movie landing pages and/or some of the webpages described in the present application whereby users can, for example, be given promotional offers, played portions of the movies relating to the image posted, and purchase and schedule social viewings.

The same real-time index information being synced with second screen type data enables the present system to show video clips of behind-the-scenes footage and alerting the consumer during real-time playback when such scenes are available. Thus, on the primary or second screen there could be an alert (e.g., stoplight) letting the user know that behind-the-scenes footage is available. By this same token, second screen descriptive data can be synchronized to the video playback and contextually relevant information may be provided in this manner in described embodiments. Similarly, soundtrack and score information is also available in sync with the real-time movie play and can be made available for sale and/or sharing through social networks.

With further general reference to all of the embodiments described herein, it should be appreciated that the above-described chat features and/or second screen functionality can be implemented through the web server 108, or through the separate ancillary content server 125 or through another server. Further, the chat features, second screen features, metadata information feeds, or other additional functionality described herein can be implemented within or integrated within the video player itself and/or served through the media server 112 or mediation server 115. The described functionalities can be divided among hardware and software elements in various ways according to business or design needs, and such variations may remain within the scope of the claims to any patent issuing from the present application.

While various embodiments in accordance with the disclosed principles have been described above, it should be understood that they have been presented by way of example only, and are not limiting. Thus, the breadth and scope of the example embodiments described herein should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

As used in the disclosures and the appended claims, the terms "example embodiment," "exemplary embodiment," and "present embodiment" do not necessarily refer to a single embodiment, although they may, and various example embodiments may be readily combined and interchanged, without departing from the scope or spirit of example embodiments. Furthermore, the terminology as used herein is for the purpose of describing example embodiments only and is not intended to be limitations. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

For example, as referred to herein, a machine or engine may be a virtual machine, computer, node, instance, host, or machine in a networked computing environment. Also as referred to herein, a networked computing environment is a collection of machines connected by communication channels that facilitate communications between machines and allow for machines to share resources. Network may also refer to a communication medium between processes on the same machine. Also as referred to herein, a server is a machine deployed to execute a program operating as a socket listener and may include software instances.

Resources may encompass any types of resources for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof.

A networked computing environment may include, but is not limited to, computing grid systems, distributed computing environments, cloud computing environment, etc. Such networked computing environments include hardware and software infrastructures configured to form a virtual organization comprised of multiple resources which may be in geographically disperse locations. Although various computer elements have been illustrated herein as single computer servers or machines, such elements may operate over several different physical machines, or they may be combined as operating code instances running on a single physical machine. The claims in the present application comprehend such variation in physical machine configurations Although various computer elements have been illustrated herein as single computer servers or machines, such elements may operate over several different physical machines, or they may be combined as operating code instances running on a single physical machine. The claims in the present application comprehend such variation in physical machine configurations.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A media sharing system for providing a multi-user shared experiencing of media content, the media sharing system comprising:
   a web server connected to an internet gateway, the web server operable to communicate with client devices connected to the internet;
   a user profile database in communication with the web server, the user profile database operable to store user profile data;
   a merchant fulfilment server for processing payment for media content;
   a digital rights management (DRM) server for using a cryptographic operation to unlock the media content in response to the merchant fulfilment server processing the payment for the media content;
   a media server in communication with the web server and the DRM server, the media server operable to provide a media stream of the media content to multiple user participants, the media server operable to synchronize playback of the media content for the multiple user participants such that the multiple user participants receive the media stream in a substantially synchronized manner, wherein the media content is displayed in a playback window of a client device; and
   a social content server in communication with the web server, the social content server operable to provide for social interactions among the multiple user participants,
   wherein the social content server being operable to provide for the social interactions among the multiple user participants comprises the social content server being operable to provide a social chat that enables at least some of the multiple user participants to send chat messages to each other in substantially real time during the playback of the media content, the social chat among the at least some of the multiple user participants being integrated with the media content such that the social chat is exchanged and displayed simultaneously as the playback of the media content, wherein at least a portion of the social chat does not obstruct the playback of the media content, wherein the social chat is indexed with the media content such that the social chat is viewable with the media content, on a computing device different from the client device and associated with a user with a right to view the media content, during a future playback of the media content, wherein ancillary content, associated with the media content, is presented on the client device, simultaneously with the media content, wherein the ancillary content is indexed with the media content, wherein separate tunnels are provided for delivering the media content and the ancillary content to the client device, wherein the media server is comprised in a cloud-based content delivery network, wherein both the media content and the social chat are archived such that the media content can be recalled and played back with the social chat in the same order as they occurred originally, wherein a user participant can initiate recall and playback of the media content together with the social chat as they occurred during a multi-user shared experiencing of the media content, and wherein the media content, the social chat, and the ancillary content are integrated by a video player,
   wherein a first user participant shares a link associated with the substantially synchronized playback of the media content, wherein the sharing of the link enables other user participants associated with the client devices to join the substantially synchronized playback of the media content, and wherein the sharing of the link occurs during when the first user participant is receiving the media content.

2. The media sharing system of claim 1, the media server further operable to receive user playback controls from at least one user participant of the multiple user participants to control the substantially synchronized playback of the media content, wherein the user playback controls are executed by the at least one user participant within the playback window that is in communication with the media server.

3. The media sharing system of claim 2, wherein the user playback controls further comprise a moderator role to control the social chat, wherein the moderator role is executed by the at least one user participant of the multiple user participants within the playback window.

4. The media sharing system of claim 1, the media server further operable to receive user playback controls from at least one user participant of the multiple user participants to control the substantially synchronized playback of the media content, wherein a scheduler-user participant of the multiple user participants is enabled to pass control of the playback of the media content to a non-scheduler user participant of the multiple user participants, wherein the control comprises at least one of rewind control or fast-forward control.

5. The media sharing system of claim 1, further comprising:
   a scheduling server in communication with the web server, the user profile database, the media server, and the social content server, wherein the scheduling server is operable in response to a user request to schedule the multi-user shared experiencing of the media content.

6. The media sharing system of claim 5, wherein the scheduling server enables at least one user participant of the multiple user participants to establish a schedule and a participant list for the multi-user shared experiencing of the media content, and wherein the media server is operable to provide the media stream to the multiple user participants according to the schedule and the participant list established by the scheduling server.

7. The media sharing system of claim 6, wherein the scheduling server enables the at least one user participant of the multiple user participants to invite others to receive the media stream according to the schedule by communicating with an external social content server to facilitate posting of user activity or user-requested media content to at least one external social network.

8. The media sharing system of claim 6, wherein the multi-user shared experiencing of the media content is a private event such that only purchasers of access to the media content who are included in the participant list are enabled to receive the media stream, and wherein the multiple user participants are purchasers of access to the media content and are included in the participant list, or wherein the multi-user shared experiencing of the media content is a public event such that any purchaser of access to the media content is enabled to receive the media stream according to the schedule.

9. The media sharing system of claim 1, wherein the substantially synchronized receipt of the media stream is effected in part by receipt of synchronization feedback signals received from video players associated with the multiple user participants.

10. The media sharing system of claim 1, wherein selection of social interaction prompts displayed on mobile device displays displaying the multiple user participants' media streams causes display of specific social interactions associated with the social interaction prompts on the mobile device displays displaying the multiple user participants' media streams.

11. The media sharing system of claim 1, wherein indicators associated with the multiple user participants are displayed on a display associated with a scheduler user participant's media stream and on displays associated with the multiple user participants' media streams, wherein an indicator to invite another user participant is displayed on the display associated with the scheduler user participant's media stream and on the displays associated with the multiple user participants' media streams.

12. The media sharing system of claim 1,
wherein the DRM server manages digital rights for the multi-user shared experiencing of the media content, and wherein the media content comprises licensed media content.

13. The media sharing system of claim 1,
wherein the DRM server manages digital rights associated with the media content,
wherein the DRM server in communication with the media server initiates recordation of the digital rights associated with the media content in the user profile database.

14. The media sharing system of claim 1, further comprising:
a game content server in communication with the media server, the game content server operable to provide game play to the multiple user participants, wherein interactive game content can be delivered substantially in parallel to the media content.

15. The media sharing system of claim 1, wherein the ancillary content, associated with the media content, is presented on a second computing device, different from the client device, simultaneously with the media content.

16. The media sharing system of claim 1, wherein index information associated with the indexing of the social chat with the media content is synchronized with the ancillary content.

17. The media sharing system of claim 1, wherein index information associated with the indexing of the social chat with the media content enables synchronization of the media content with the ancillary content.

18. The media sharing system of claim 1, wherein the indexing of the social chat with the media content enables relative synchronicity of at least two client devices simultaneously displaying the media content.

19. The media sharing system of claim 1, wherein the user is part of a social networking group associated with a provider of the media content.

20. The media sharing system of claim 1, wherein the media content, the social chat, and the ancillary content are integrated by an embedded functionality of the video player.

21. A media sharing system for providing a multi-user shared experiencing of media content, the media sharing system comprising:
a web server connected to an internet gateway, the web server operable to communicate with client devices connected to the internet;
a user profile database in communication with the web server, the user profile database operable to store user profile data;
a merchant fulfilment server for processing payment for media content;
a digital rights management (DRM) server for using a cryptographic operation to unlock the media content in response to the merchant fulfilment server processing the payment for the media content;
a scheduling server in communication with the web server and the user profile database, the scheduling server operable in response to a user request associated with a scheduler user participant to schedule a multi-user shared experiencing of the media content, establishing a schedule and a participant list for the multi-user shared experiencing of the media content;
a media server in communication with the web server, the DRM server, and the scheduling server, the media server operable to provide a media stream of the media content to multiple scheduled user participants according to the schedule and the participant list established by the scheduling server, the media server operable to synchronize playback of the media content for the multiple user participants such that the multiple user participants receive the media stream in a substantially synchronized manner, wherein the media content is displayed in a playback window of a client device;
a media database in communication with the media server, the media database comprising the media content to be streamed by the media server; and
a social content server in communication with the web server, the social content server operable to provide for social interactions among the multiple user participants,
wherein the social content server being operable to provide for the social interactions among the multiple user participants comprises the social content server being operable to provide a social chat that enables at least some of the multiple user participants to send chat messages to each other in substantially real time during the playback of the media content, the social chat among the at least some of the multiple user participants being integrated with the media content such that the social chat is exchanged and displayed simultaneously as the playback of the media content, wherein the media content comprises video content, wherein the social chat is indexed with the media content such that the social chat is viewable with the media content, on a computing device different from the client device and associated with a user with a right to view the media content, during a future playback of the media content, wherein ancillary content, associated with the media content, is presented on the client device, simultaneously with the media content, wherein the ancillary content is indexed with the media content, wherein separate tunnels are provided for delivering the media content and the ancillary content to the client device, wherein both the media content and the social chat are archived such that the media content can be recalled and played back with the social chat in the same order as they occurred originally, wherein a user participant can initiate recall and playback of the media content together with the social chat as they occurred during the multi-user shared experiencing of the media content, and wherein the media content, the social chat, and the ancillary content are integrated by a video application, wherein a first user participant shares a link associated with the substantially synchronized playback of the media content, wherein the sharing of the link enables other user participants associated with the client devices to join the substantially synchronized playback of the media content, and wherein the sharing of the link occurs during when the first user participant is receiving the media content.

22. The media sharing system of claim 21, wherein indicators associated with the multiple user participants are displayed on a display associated with the scheduler user participant's media stream and on displays associated with the multiple user participants' media streams, wherein an indicator to invite another user participant is displayed on the display associated with the scheduler user participant's media stream and on the displays associated with the multiple user participants' media streams.

23. A media sharing system for providing a multi-user shared experiencing of media content, the media sharing system comprising:
  a web server connected to an internet gateway, the web server operable to communicate with client devices connected to the internet;
  a user profile database in communication with the web server, the user profile database operable to store user profile data;
  a merchant fulfilment server for processing payment for media content;
  a digital rights management (DRM) server for using a cryptographic operation to unlock the media content in response to the merchant fulfilment server processing the payment for the media content;
  a media server in communication with the web server and the DRM server, the media server operable to provide a media stream of the media content to multiple user participants connected through the internet, the media server operable to synchronize playback of the media content for the multiple user participants such that the multiple user participants receive the media stream in a substantially synchronized manner, wherein the media content is displayed on a client device; and
  a social content server in communication with the web server, the social content server operable to provide for social interactions among the multiple user participants,
  wherein the social content server being operable to provide for the social interactions among the multiple user participants comprises the social content server being operable to provide a social chat that enables at least some of the multiple user participants to send chat messages to each other in substantially real time during the playback of the media content, the social chat among the at least some of the multiple user participants being displayed simultaneously with the playback of the media content, wherein the social chat is indexed with the media content such that the social chat is viewable with the media content, on a computing device different from the client device and associated with a user with a right to view the media content, during a future playback of the media content, wherein ancillary content, associated with the media content, is presented on the client device, simultaneously with the media content, wherein the ancillary content is indexed with the media content, wherein separate tunnels are provided for delivering the media content and the ancillary content to the client device, wherein both the media content and the social chat are archived such that the media content can be recalled and played back with the social chat in the same order as they occurred originally, wherein a user participant can initiate recall and playback of the media content together with the social chat as they occurred during a multi-user shared experiencing of the media content, and wherein the media content, the social chat, and the ancillary content are integrated by a video application,
  wherein a first user participant shares a link associated with the substantially synchronized playback of the media content, wherein the sharing of the link enables other user participants associated with the client devices to join the substantially synchronized playback of the media content, and wherein the sharing of the link occurs during when the first user participant is receiving the media content.

24. The media sharing system of claim 23, the social content server further operable to communicate with external social servers to facilitate posting of user activities or user-requested media content to at least one of the user participant's external social networks.

25. The media sharing system of claim 23, wherein the media server is comprised in a cloud-based content delivery network.

26. The media sharing system of claim 23, further comprising an ancillary content server, different from the web server, for providing the ancillary content.

* * * * *